United States Patent [19]

Kodera et al.

[11] Patent Number: 4,486,868

[45] Date of Patent: Dec. 4, 1984

[54] ULTRASONIC WAVE CONVERSION APPARATUS

[75] Inventors: Masao Kodera; Sigeyuki Akita, both of Okazaki, Japan

[73] Assignee: Nippon Soken, Inc., Nishio, Japan

[21] Appl. No.: 305,358

[22] Filed: Sep. 24, 1981

[30] Foreign Application Priority Data

Oct. 6, 1980 [JP] Japan .............................. 55-141577

[51] Int. Cl.[3] .......................... G01V 1/18; H04R 1/16

[52] U.S. Cl. .................................... 367/140; 310/321; 310/322; 179/140; 179/110 A

[58] Field of Search .................... 367/140; 310/313 B, 310/325, 322, 321; 179/140, 110 A

[56] References Cited

U.S. PATENT DOCUMENTS 3,675,053 7/1972 Mifune et al. .................. 179/110 A 4,193,009 3/1980 Durley ............................... 310/325

*Primary Examiner*—Nelson Moskowitz

*Assistant Examiner*—Ian Lobo

*Attorney, Agent, or Firm*—Cushman, Darby & Cushman

[57] ABSTRACT

An ultrasonic wave conversion apparatus comprises electrodes, a support member for supporting the electrodes, a vibrator secured to the support member by a securing member, and a moving diaphragm fixed to the vibrator by a fixing member. The surface of portions of the electrodes, the vibrator, the moving diaphragm and the fixing member are coated with an insulating film of a predetermined thickness. The coating with this insulating film provides the apparatus with an excellent insulating and anticorrosive property and further an excellent damping characteristic for the vibration of the vibrating members of the apparatus.

4 Claims, 2 Drawing Figures

ULTRASONIC WAVE CONVERSION APPARATUS

FIELD OF THE INVENTION

The present invention relates to an ultrasonic wave conversion apparatus for converting an electrical signal into an ultrasonic wave signal and also an ultrasonic wave signal into an electrical signal, and more particularly to an ultrasonic wave conversion apparatus for use in an obstacle detector for a vehicle or the like.

DESCRIPTION OF THE PRIOR ART

Figure 1:
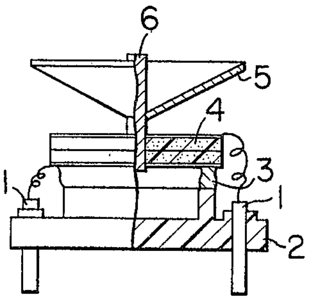
FIG. 1 is a partially sectional assembly drawing showing the construction of a conventional ultrasonic wave conversion apparatus.

As shown in FIG. 1, a conventional ultrasonic wave conversion apparatus comprises electrodes 1, a support member 2 for supporting the electrodes 1, a vibrator 4 secured to the support member 2 by a securing member 3, and a moving diaphragm 5 secured to the vibrator 4 by a fixing member 6.

When the conventional ultrasonic wave conversion apparatus is used in an apparatus such as an obstacle detector for a vehicle or the like which is operated outdoors, there has been a defect such that, if water drops attach to the vibrator 4 at the time of washing the vehicle or in the case of rain, not only the apparatus becomes inoperative by a short-circuit between the electrodes 1 on the one hand, but also the continued energization of the apparatus with water drops attached may cause corrosion of the apparatus on the other hand. Further, when a single ultrasonic wave conversion apparatus of a conventional type is used to effect transmission and reception of pulsed ultrasonic waves and to measure a distance from the vehicle to an object by the time required for the pulsed ultrasonic waves to travel from the transmitting point to the receiving point, there has been a drawback such that, even after the application of an electrical signal to the electrodes 1 for transmitting pulsed ultrasonic waves has been stopped, the moving diaphragm 5 fails to stop vibrating within a short time and continues damped vibration, thus making it impossible to measure a short distance.

The present invention has been made with the intention of obviating the above-mentioned disadvantages of the conventional ultrasonic wave conversion apparatus.

SUMMARY OF THE INVENTION

It is an object of the present invention to provide an ultrasonic wave conversion apparatus in which necessary portions of a conventional ultrasonic wave conversion apparatus are coated with an insulating resin film thereby to have a high water-resistant property and at the same to have the decay time of the vibration of the moving diaphragm of the apparatus, which occurs when the vibrator is driven by electric pulses, reduced by the damping effect of the insulating resin film.

DESCRIPTION OF THE PREFERRED EMBODIMENT

An embodiment of the present invention will be described hereinafter by making reference to FIG. 2.

Figure 2:
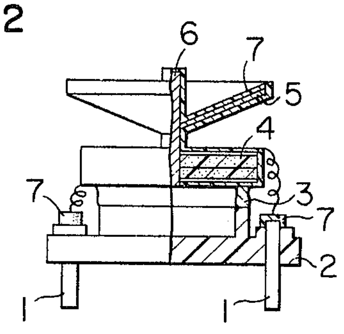
FIG. 2 is a partially sectional assembly drawing showing the construction of an ultrasonic wave conversion apparatus according to an embodiment of the present invention.

In FIG. 2, reference numeral 1 designates electrodes of the ultrasonic wave conversion apparatus of the present invention, numeral 2 a support member made of an insulating resin material for supporting the electrodes 1, numeral 3 a securing member, numeral 4 a vibrator (a ceramic vibrator was used as an example in this embodiment) secured to the support member 2 by the securing member 3, numeral 5 a moving diaphragm, numeral 6 a fixing member for fixing the moving diaphragm to the ceramic vibrator 4, and numeral 7 an insulating film coating therewith the portions of the moving diaphragm 5, the ceramic vibrator 4, the fixing member 6 and the electrodes 1, which are exposed to external atmosphere. It has been found that, in order to attain the object of the present invention, it is suitable to select polytetrafluoroethylene as a material for the insulating film 7 and at the same time to make the thickness of the insulating film approximately 30 $\mu$m. Further, in the embodiment of the present invention, Teflon (the trade name of polytetrafluoroethylene produced by Du Pont) was used as a material for the insulating film.

In the ultrasonic wave conversion apparatus having the above-described construction according to the present invention, as shown in FIG. 2, the portions of the surfaces of the moving diaphragm 5, the ceramic vibrator 4, the electrodes 1 and the fixing member 6 which are exposed to external atmosphere are coated with a Teflon film, and therefore no short-circuit failure occurs at these portions even if water drops attach to the surfaces of such portions, and at the same time it is possible to prevent corrosion from occurring in the apparatus. Further, the Teflon film, with which the moving diaphragm 5 is coated, functions as a damping member to shorten the duration of the damped vibration of the moving diaphragm 5 when it is driven by electric pulses applied. An experiment conducted on the ultrasonic wave conversion apparatus having the construction according to the present invention showed that the duration of the damped vibration of its moving diaphragm 5 is reduced to approximately one fifth of that of a conventional ultrasonic wave conversion apparatus.

In the above-described embodiment of this invention, polytetrafluoroethylene was used as an example of the material for the coating film which is suitable for the object of the present invention. However, an insulating film made of other materials including an epoxy resin, for example, may be used instead to obtain an equal effect.

With the construction of the ultrasonic wave conversion apparatus according to the present invention, the coating of necessary portions of the surfaces of the moving diaphragm 5, the vibrator 4, the electrodes 1 and the fixing member 6 with a suitable insulating film brings an advantage to provide the apparatus with a high water-resisting property and thereby to prevent the occurrence of a short-circuit failure and the corrosion of the apparatus due to water drops attached thereto. At the same time, the insulating film, with which the moving diaphragm 5 is coated, acts as a damping member and thereby makes it possible to greatly reduce the duration of the damped vibration of the moving diaphragm 5 driven by electric pulses applied to the vibrator 4. Further, when the apparatus according to the present invention is used as a transmitter-receiver of a distance measuring apparatus, it is made possible to effect the measurement of a very short distance which has been difficult to accomplish with ultrasonic wave conversion apparatuses of a conventional construction.

We claim:

1. An ultrasonic wave conversion apparatus including electrodes, a support member for supporting said electrodes, a vibrator, a securing member for securing said vibrator to said support member, a moving diaphragm, a fixing member for fixing said moving diaphragm to said vibrator, and an insulating film of a predetermined thickness coating whole surfaces of said electrodes, said vibrator, said moving diaphragm and said fixing member which are exposed to external atmosphere, said insulating film coating said moving diaphragm functioning as a damping member to shorten the duration of the damped vibration of said moving diaphragm.

2. An ultrasonic wave conversion apparatus according to claim 1, wherein said insulating film is made of a synthetic resin.

3. An ultrasonic wave conversion apparatus according to claim 2, wherein said insulating film is made of polytetrafluoroethylene.

4. An ultrasonic wave conversion apparatus according to claim 3, wherein the thickness of said insulating film made of polytetrafluoroethylene is selected to be approximately 30 $\mu m$.

* * * * *